United States Patent
Conti et al.

(10) Patent No.: US 11,370,188 B2
(45) Date of Patent: Jun. 28, 2022

(54) PROCESS AND APPARATUS FOR UNLOADING A VULCANISED BICYCLE TYRE FROM A VULCANISATION PRESS

(71) Applicant: Pirelli Tyre S.p.A., Milan (IT)

(72) Inventors: Davide Lupo Conti, Milan (IT); Bruno Lodi, Santo Andre (BR); Gian Luigi Bosio, Turin (IT)

(73) Assignee: PIRELLI TYRE S.p.A., Milan (IT)

(*) Notice: Subject to any disclaimer, the term of this patent is extended or adjusted under 35 U.S.C. 154(b) by 216 days.

(21) Appl. No.: 16/472,410

(22) PCT Filed: Nov. 29, 2017

(86) PCT No.: PCT/IB2017/057485
§ 371 (c)(1),
(2) Date: Jun. 21, 2019

(87) PCT Pub. No.: WO2018/122645
PCT Pub. Date: Jul. 5, 2018

(65) Prior Publication Data
US 2019/0358922 A1    Nov. 28, 2019

(30) Foreign Application Priority Data
Dec. 28, 2016 (IT) .......................... 102016000131439

(51) Int. Cl.
B29D 30/06    (2006.01)

(52) U.S. Cl.
CPC .................. B29D 30/0603 (2013.01)

(58) Field of Classification Search
CPC ................................. B29D 30/0603
See application file for complete search history.

(56) References Cited

U.S. PATENT DOCUMENTS 1,976,833 A * 10/1934 Brundage .......... B29D 30/0601
425/38
2,970,342 A *  2/1961 Frohlich ............. B29D 30/0645
425/33
(Continued)

FOREIGN PATENT DOCUMENTS

EP    0289469 A2    11/1988

OTHER PUBLICATIONS

International Search Report form the European Patent Office in corresponding International Application No. PCT/IB2017/057485 dated Apr. 18, 2018.
(Continued)

Primary Examiner — Niki Bakhtiari
Assistant Examiner — John J DeRusso
(74) Attorney, Agent, or Firm — Finnegan, Henderson, Farabow, Garrett & Dunner, L.L.P.

(57) ABSTRACT

A vulcanised bicycle tyre (2) is retained by exerting a thrust action on the radially inner surface of the tyre directed radially away from the geometric axis of rotation thereof (X). An unloading device (12) provided with at least one frame (18) and at least one support member (19) of the tyre (2) is positioned with respect to the tyre (2) by aligning it with the geometric axis of rotation (X) of the tyre. The support member (19) is handled with respect to the frame (18) towards an operating position in which it is close to the radially outer surface (2b) of the tyre (2). Finally, the radial thrust action on the radially inner surface (2a) of the tyre (2) is interrupted for releasing said tyre (2) with the radially outer surface (2b) thereof on a contact surface (20) of the support member (19).

37 Claims, 9 Drawing Sheets

(56) References Cited

U.S. PATENT DOCUMENTS

| | | | | |
|---|---|---|---|---|
| 3,396,221 A | * | 8/1968 | Musch | B29D 30/0645 |
| | | | | 264/315 |
| 3,824,048 A | * | 7/1974 | Getz | B29D 30/0645 |
| | | | | 425/52 |
| 4,447,385 A | * | 5/1984 | Blosser | B29D 30/0603 |
| | | | | 264/315 |
| 4,608,219 A | | 8/1986 | Singh et al. | |
| 4,871,305 A | | 10/1989 | Galigani | |
| 8,807,976 B1 | * | 8/2014 | Delgado | B29D 30/0005 |
| | | | | 425/28.1 |

OTHER PUBLICATIONS

Written Opinion of the International Searching Authority from the European Patent Office in corresponding International Application No. PCT/IB2017/057485 dated Apr. 18, 2018.

* cited by examiner

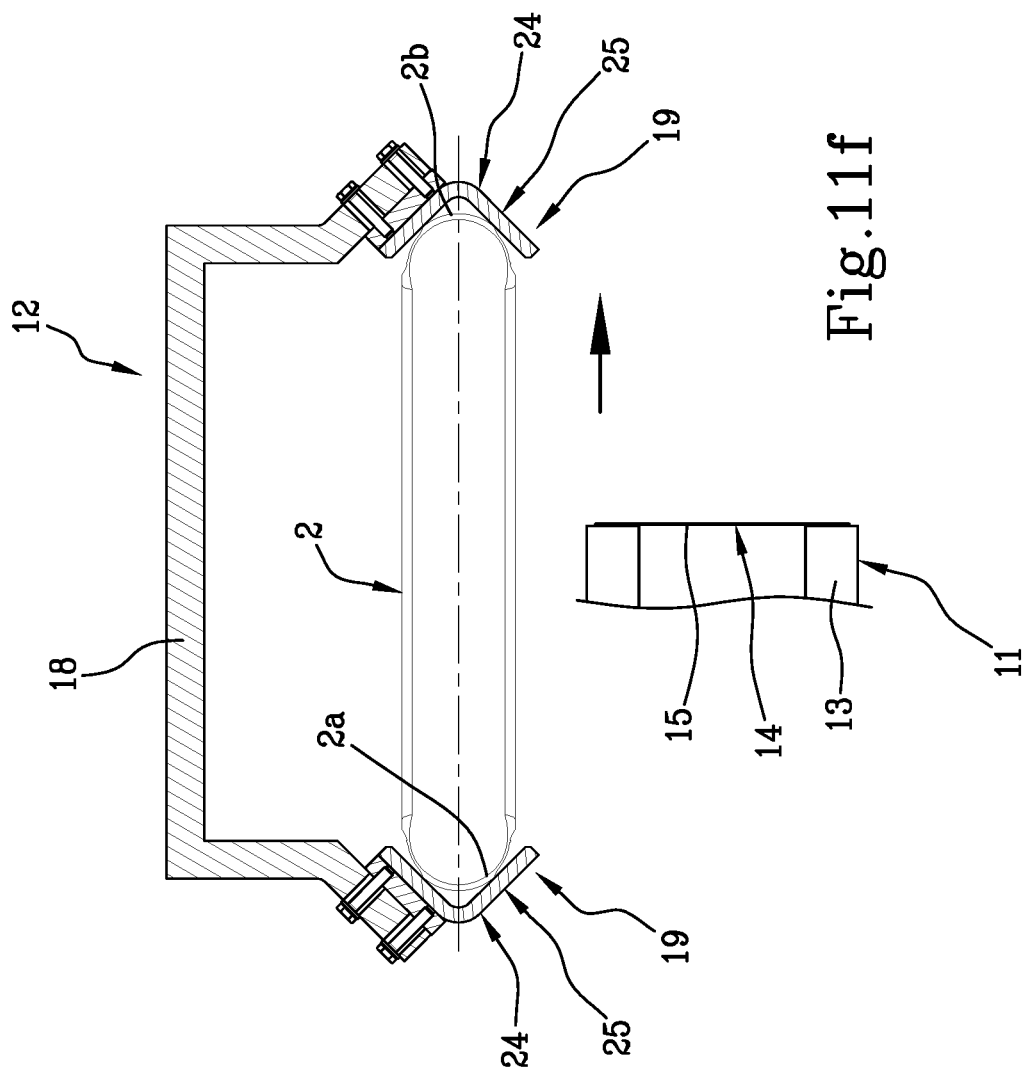
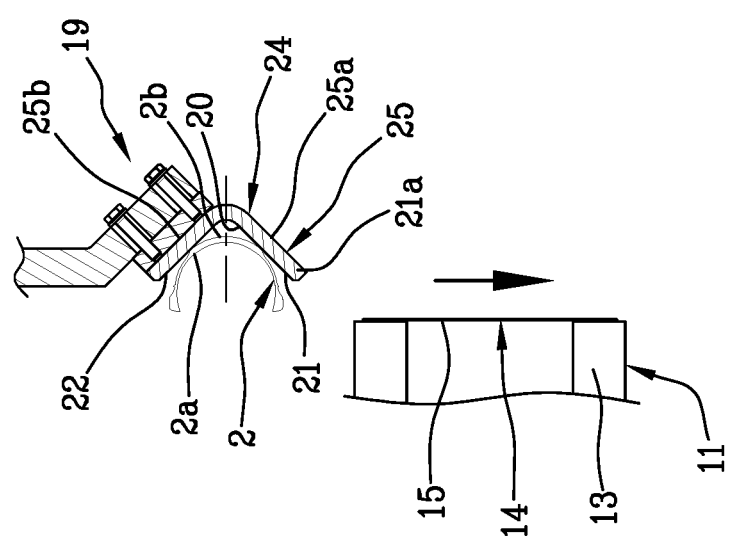

PROCESS AND APPARATUS FOR UNLOADING A VULCANISED BICYCLE TYRE FROM A VULCANISATION PRESS

This is application is a Section 371 national phase application based on International Application No. PCT/IB2017/057485, filed Nov. 29, 2017, and claims priority to Italian Patent Application No. 102019000131439, filed Dec. 28, 2016; the content of each application is incorporated herein by reference.

The present invention relates to a process and an apparatus for unloading a vulcanised bicycle tyre from a vulcanisation press.

The building of a tyre for bicycles usually provides that one or more carcass plies are applied according to a cylindrical configuration around an outer surface of a building drum. A pair of bead cores are fitted or applied each around one of the axially opposite end flaps of the carcass ply. The end flaps are then turned up around the respective bead cores. A tread band is then applied around the carcass ply lying against the building drum, in an axially centred position with respect to the bead cores.

The mutual axial distance between the bead cores remains unchanged during the entire building process, including the application of the tread band. This process aspect represents a unique feature that distinguishes bicycle tyres from radial tyres for motor vehicles. For the latter, in fact, a mutual approach step of the bead cores is normally provided to shape the carcass structure according to a toroidal configuration in the coupling step with the belt structure.

Once the building has been completed, the built green tyre for bicycle is removed from the drum to be transferred in a vulcanisation press, where the tyre itself is subjected to a moulding and vulcanisation treatment aimed at determining the structural stabilisation thereof via cross-linking of the elastomeric material present therein, as well as optionally imprinting a desired tread design on the tread band.

The term "elastonneric material" is used to designate a composition comprising at least one elastomeric polymer and at least one reinforcement filler. Preferably, such a composition further comprises additives such as cross-linking agents and/or plasticisers. Due to the presence of the cross-linking agents, such a material can be cross-linked by heating so as to form the final manufactured article.

The terms "radial" and "axial" and the expressions "radially inner/outer" and "axially inner/outer" are used with reference to the radial direction of the tyre (i.e. to a direction perpendicular to the axis of rotation of the tyre) and to the axial direction of the tyre (i.e. to a direction parallel to the axis of rotation of the tyre). The terms "circumferential" and "circumferentially" are instead used with reference to the annular development of the tyre. A radial plane of the tyre contains the axis of rotation thereof.

The expressions "low", "below", "lower" or "inferiorly", and "high", "above", "upper" or "superiorly" are used to designate a relative position (with respect to the ground) of an element with respect to another and/or of an element with respect to the ground.

"Geometric axis of rotation" of a tyre means the axis corresponding to the axis of rotation of the tyre when mounted in operating conditions on a respective mounting rim.

The term "axial centreline" is used to designate a portion of the tyre arranged substantially at a plane perpendicular to the geometric axis of rotation and equidistant from the axially outer portions of the tyre itself.

In relation to vulcanisation, in the prior art there essentially are at least two types of vulcanisation press, with single location and multiple location, respectively.

Single-location presses are provided with a single vulcanisation mould, normally made of two half-parts, housing a radially expandable vulcanisation bladder, fixed around a central support.

The green tyre coming from the building line is picked up by an operator to be fitted around the vulcanisation bladder. The half-parts of the mould are closed and the bladder, previously mounted inside the vulcaniser, is inflated with pressurised steam or compressed air, or nitrogen or a mixture of the previous fluids, so as to press the tyre against the inner walls the mould and cause the vulcanisation thereof by heat. At the end of the vulcanisation, the mould half-parts are moved away from each other and the operator picks up the vulcanised tyre to replace it with a new green tyre to be vulcanised. This machine configuration, where each mould has a relative bladder previously mounted on the vulcaniser, can generally have up to two, three moulds stacked on top of each other.

There are also multiple-location vulcanisation presses, including multiple vulcanisation moulds stacked vertically on top of each other, generally up to a maximum of 7 moulds where, however, the bladder is not fixed on the vulcaniser. The use of multiple-location presses without fixed bladder or so-called central mechanism requires that an operator provides to introduce an expandable tubular chamber within each green tyre built to be treated. The operator then introduces each tyre coupled to the respective vulcanisation chamber between the half-parts of each vulcanisation mould, making sure that each chamber is connected to a steam feeding conduit, or compressed air, or nitrogen or a mixture of the previous fluids, by means of valve members provided for this purpose. At the end of the vulcanisation, the half-parts of each mould are moved away from each other and the operator picks up the vulcanised tyre to replace it with a new green tyre to be vulcanised and remove the vulcanisation chamber from each vulcanised tyre.

There are multiple-location presses in which the opening and closing cycles of the moulds and of vulcanisation are carried out simultaneously on all tyres loaded into the press. In other cases, a sequential opening of the moulds is carried out so as to perform the vulcanisation of the single tyres with interspersed times according to an on-going process.

The Applicant has noted that bicycle tyres, even in vulcanised condition, are often without a structural consistency sufficient to allow the proper handling thereof by means of mechanical devices commonly used in other areas.

According to the Applicant, this is at least partly due to the normal absence, in bicycle tyres, of belt reinforcement layers interposed between the carcass ply or plies and the tread band.

In fact, the absence of a belting layer able to stiffen the structure significantly increases the deformability of the tyre also under the action of its own weight, actually making the conformation that the tyre will take once conformed or once extracted from the vulcaniser not predictable in advance.

This situation is currently accentuated by recent developments in the bicycle tyre market, where products characterized by high deformability have become more widespread.

In fact, in many bicycle tyre models, the conventional metallic bead cores are replaced by nylon, aramid, carbon and/or other natural or synthetic fibres, which ensure a satisfactory tensile strength, but feature a poor resistance to bending deformation.

For these reasons, bicycle tyres are often produced using mostly manual processes.

The Applicant therefore deems it desirable to find a solution so that vulcanised tyres for bicycle can be removed in an automated manner from the vulcanisation press, despite their poor manipulability.

The Applicant has thus perceived that arranging an equipment able to exercise adequate control of the conformation of the tyre in the unloading step may facilitate the removal operations from the vulcanisation press, as well as any loading or gripping by a subsequent device.

In that regard, the Applicant has identified that one of the problems to be overcome in automating the unloading process lies mainly in the limited stiffness of the finished tyre, making it complicated to use conventional gripping and expansion systems acting in the radially inner region of the tyre.

Moreover, the Applicant has deemed particularly advantageous to arrange an apparatus capable of limiting the freedom of movement of the tyre, effectively constraining the geometry thereof throughout the unloading process from the press.

In that regard, the Applicant has finally found that if at the end of the vulcanisation, the tyre is released on one or more support members circumferentially distributed and operating outside the tyre itself, it is possible to ensure the uniqueness of the gripping region and the handling of the bicycle tyre, despite the typical structural yielding that would tend to make the tyre take a deformed development also under the effect of minimal stresses.

More in particular, according to a first aspect thereof, the invention relates to a process for unloading a vulcanised bicycle tyre from a vulcanisation press.

Preferably, said tyre comprises a concave radially inner surface and a convex radially outer surface, both developing between a first radially inner edge and a second radially inner edge of the tyre.

Preferably, said tyre is arranged with a geometric axis of rotation thereof arranged transversely to a horizontal plane so that the first edge is placed at a lower height with respect to said second edge.

Preferably, it is provided to retain said tyre by exerting a thrust action on the radially inner surface directed radially away from the geometric axis of rotation.

Preferably, it is provided to arrange an unloading device provided with at least one frame and at least one support member of the tyre, said at least one support member being arranged around a loading axis and movable with respect to said frame.

Preferably, it is provided to position the unloading device with respect to the tyre aligning said loading axis with the geometric axis of rotation of the tyre.

Preferably, it is provided to handle the support member with respect to the frame and towards an operating position in which it is next to the radially outer surface of the tyre.

Preferably, it is provided to interrupt said radial thrust action on the radially inner surface of the tyre for releasing said tyre with the radially outer surface thereof on a contact surface of the support member handled in said operating position.

The Applicant believes that arranging the engagement of the tyre on the outer surfaces thereof allows facilitating the automated gripping thereof for unloading from the vulcanisation press without the structural deformability of the tyre itself preventing the handling thereof. When the vulcanising press is open, it is also possible to take advantage of wide spaces available outside of the tyre, so as to facilitate the approach of the unloading device and of the gripping member or members to the tyre without risk of undesired mechanical interference. The possibility of supporting the tyre from the exterior also facilitates the removal or extraction of the retaining device placed inside the tyre as the region radially inside the tyre is free of obstacles. In addition, the maintenance of a radial thrust on the radially inner surface of the tyre until the positioning of the support member has taken place promotes a correct retention of the vulcanised tyre, thereby improving the accuracy of the engagement with the support member or members.

According to a further aspect thereof, the present invention relates to an apparatus for unloading a vulcanised bicycle tyre from a vulcanisation press.

Preferably, at least one retaining device of the tyre is provided, provided with an operating axis thereof provided with an active portion configured for exerting a thrust action on the radially inner surface of the tyre directed radially away from the operating axis for maintaining the tyre in a predetermined work region.

Preferably, an unloading device is provided, having at least one frame and a support member of the tyre arranged around a loading axis.

Preferably, the unloading device is selectively movable towards and away from the operating axis for aligning said loading axis with said operating axis.

Preferably, said support member is selectively movable with respect to the frame approaching the work region until reaching an operating position located in a radially outer position to said active portion.

The Applicant deems it advantageous to use an unloading device operating in a position radially outside the tyre, thereby taking advantage of the wide space available outside the radial dimension of the press without any problems of mechanical interference between mutually moving parts. The Applicant also believes that by dividing the movement of the support member in a centring stroke and a radial positioning it is possible to obtain an apparatus which optimises the overall dimensions and optimises the placement of each support member in the operating position. In particular, the synergistic effect resulting from the presence of a retaining device capable of imparting a certain position to the tyre together with one or more support members circumferentially distributed around the tyre allows making the unloading procedure of the vulcanised tyre from the press unique and predetermined, and thus easily controllable and automatable.

In at least one of the above aspects, the invention may further comprise one or more of the following preferred features.

Preferably, upon reaching said operating position, the contact surface of the support member is located at least partially below an axially lower portion of the tyre extending radially away from the first radially inner edge.

Preferably, in said operating position, the contact surface of the support member is located in a lower position with respect to the first radially inner edge.

Advantageously, in this way at least a portion of the support member supports the tyre in complete support, thus eliminating the need for complex retention equipment in suspension. The engagement between the support member and the tyre is therefore facilitated, which can be simply dropped on the contact surface following the interruption of the radial thrust from the interior.

Preferably, the support member has a contact surface of the tyre which in said operating position is at least in part facing upwards.

Advantageously, in this way the tyre is supported at least in part in leaning, thus obviating the difficulties that would exist in a "hanging" gripping, which would retain the tyre by frictional forces.

Preferably, in the operating position, the contact surface of said support member at least partially circumscribes an axially lower portion of said tyre, extending from said first radially inner edge.

Preferably, the contact surface of said support member is concave.

Preferably, the contact surface of the support member has a concave axial development.

Advantageously, such a shape defines a seat for receiving and radially retaining the tyre, operating in the vicinity of an axially lower portion of the radially outer surface of the tyre itself. Such a support member is therefore able to support the tyre also exerting a containment action of the deformation thereof.

Preferably, upon reaching the operating position, the support member contacts the radially outer surface of the tyre.

A transfer of the tyre to the gripping member following the interruption of the radial thrust action on the radially inner surface is thus promoted, preventing the fall of the tyre on a surface placed at an overly lower height from causing the onset of shock or undesired stresses and which could excessively deform the tyre.

Preferably, the handling of the support member involves translating the support member from a rest position towards the operating position along a handling path directed in approach to the radially outer surface of the tyre.

Advantageously, in his way, the support member approaches the tyre from the exterior, thus being able to approach the radially outer surface thereof as close as possible without interfering with mechanical parts of the vulcaniser.

Preferably, the handling path comprises at least one contraction stroke extending between a radially outer distal position with respect to the geometric axis of rotation of the tyre and a position proximal to said geometric axis of rotation.

The Applicant believes that the use of a radially contractible device is particularly adapted to exert a circumferential containment of the tyre, with considerable plant simplicity.

Preferably, the position proximal to said geometric axis of rotation corresponds to said operating position.

Preferably, the contraction stroke is oriented orthogonally to said geometric axis of rotation.

Advantageously, the orthogonal contraction of the device allows approaching the radially outer surface of the tyre with an approach direction that allows the support member to come into contact with such a surface without generating sliding movements that could damage the tread band just vulcanised.

Preferably, said handling path develops in a plane orthogonal to said geometric axis of rotation.

An embodiment simplification of the unloading device is therefore achievable.

Preferably, positioning the unloading device comprises arranging the unloading device itself with respect to the tyre so that the support member is placed in said rest position.

Advantageously, in this way, the two movements of positioning of the unloading device and contraction of the support members are uncoupled, thus simplifying both the kinematics and the handling control.

Preferably, the retaining device is configured to retain the tyre at a predetermined operating height.

More preferably, the rest position of the support member is substantially placed at said operating height of the tyre, in a radially outer position thereto.

Preferably, said handling path of the support member provides for a contraction of the support member on the tyre from a radially expanded condition to a radially contracted condition.

Advantageously, in this way, it is possible to place the device around the tyre in the rest position, with overall dimensions of the unloading device not interfering with those of the retaining device.

Preferably, said radially contracted position of the support member corresponds to said operating position.

Preferably, the support member comprises a plurality of support sectors mutually angularly spaced around the loading axis and movable in mutual distancing and approach between said radially expanded condition and said radially contracted condition.

Advantageously, in this way it is possible to circumferentially distribute the supporting action, thus preventing the deformability of the tyre from making it fall from the unloading device.

Preferably, the contraction of the support member is achieved by handling the sectors radially, with respect to the loading axis, in mutual approach.

Preferably, said thrust action is carried out by means of a retaining device coaxial to said geometric axis of rotation of the tyre.

Preferably, the thrust action involves radially expanding a radially expandable peripheral portion of the retaining device.

Preferably, it is provided to lift the tyre from a vulcanisation height to an operating height, higher than said vulcanisation height.

The cooperation between the central body of the vulcaniser and the unloading device is thus facilitated.

Preferably, said lifting is carried out by vertical translation of said retaining device.

Preferably, it is provided to axially extract the retaining device from the tyre following said interruption of the thrust action.

Preferably, the retaining device is configured to retain the tyre at a predetermined operating height.

Preferably, the extraction of the retaining device provides for lowering said retaining device from said operating height as a result of said interruption of the thrust action.

Preferably, positioning the unloading device comprises translating said unloading device along a centring path towards said geometric axis of rotation from a radially outer position with respect to the tyre.

Preferably, it is provided to transfer the tyre released on the contact surface to an unloading station by means of a displacement of the unloading device from a loading position, corresponding to the operating position of the support member, to an unloading position.

Preferably, the support member is provided with a contact surface which, in the operating position, has a supporting portion facing upwards.

Preferably, in the operating position, the supporting portion is placed at an axially lower position to said tyre.

Preferably, the contact surface has a containment portion shaped to define a radial retaining of the tyre.

Preferably, the containment portion is angled with respect to the supporting portion.

Preferably, the containment portion defines an angle of between about 60° and about 150° with the supporting portion.

Preferably, the containment portion rises on a continuation of the supporting portion.

Advantageously, this allows imparting not only a bottom support, but also a radial containment to the tyre, thus favouring the stability thereof in the unloading step.

Preferably, the contact surface has a concave shape that, in said operating position, at least partially circumscribes an axially lower portion of said tyre engaged with the retaining device.

Preferably, the contact surface of the support member has a concave axial development.

Preferably, said retaining device comprises a central body and a radially expandable peripheral portion, defining said active portion and configured for generating said thrust action.

Preferably, the radially expandable peripheral portion of the retaining device comprises at least one deformable membrane.

Preferably, the deformable membrane is expandable from a contracted condition to an expanded condition, in which it is substantially counter-shaped to the radially inner surface of the tyre.

Preferably, said retaining device is defined at least partially by a central body of a vulcanisation press.

The Applicant in this regard has deemed optimal to use the equipment already present in the vulcaniser, in order to simplify the integration of the apparatus in the existing vulcanisation systems.

Preferably, said retaining device comprises an annular chamber delimited in radially outer position by said deformable membrane and placed in fluid connection with a pressurised fluid source for controlling the expansion or contraction of the deformable membrane.

Preferably, lifting means are provided, connected to the retaining device and configured for translating it vertically from a vulcanisation height, in which the retaining device lies within a lower half-mould of a vulcanisation press, to an upper operating height, in which the retaining device is raised with respect to said lower half-mould.

Advantageously, the possibility of carrying out the lifting of the tyre frees space below the same, thus simplifying the positioning of the unloading device, and in particular of the support member.

Preferably, in said operating position, the support member is placed in a region that is radially outer to said central body of the retaining device.

Preferably, the unloading device comprises a handling group operatively interposed between the frame and the support member and configured for translating said support member towards the operating position.

Preferably, the handling group is configured for handling said support member from a position distal from the operating axis of the retaining device to a position proximal to said operating axis.

Preferably, the handling group is configured for handling said support member from a distal position with respect to a radially outer surface of the tyre to a position proximal to said radially outer surface.

Preferably, the position proximal to the operating axis and/or the position proximal to the radially outer surface correspond to the operating position of the support member.

Preferably, the handling group is configured for guiding said support member towards the operating position according to a handling path having at least one radial contraction stroke directed in approach to the retaining device.

Advantageously, in this way, the support member is positioned around the tyre through the "centring" movement of the unloading device and subsequently (or simultaneously) contracted, so as to embrace in a circumferentially distributed manner the radially outer surface thereof, thus promoting the stability of the loading.

Preferably, the contraction stroke is oriented orthogonally to said operating axis of the retaining device.

Preferably, the handling path develops in a plane orthogonal to said operating axis of the retaining device.

Preferably, the support member comprises a plurality of support sectors mutually angularly spaced apart around the loading axis.

The structure in sectors has enabled the Applicant to achieve an efficient unloading device capable of circumferentially distributing its support action, thus maximising stability of the tyre in the loading step.

Preferably, each sector has a concave axial development.

Preferably, the handling group is configured for contracting the unloading device from a radially expanded condition, in which the sectors are mutually moved apart, to a radially contracted condition, in which the sectors are mutually approached.

Preferably, the radially contracted condition of the sectors corresponds to said operating position of the support member.

Preferably, the presence of a translating group is provided, associated to the unloading device and configured for translating it transversely to said operating axis of the retaining device.

Preferably, the translating group is configured for handling the unloading device between a position radially distal from the operating axis and a position radially centred with said operating axis.

Preferably, a collector is provided for one or more tyres arranged at said radially distal position.

Further features and advantages will become more apparent from the detailed description of a preferred but non-exclusive embodiment of a process and an apparatus for unloading a vulcanised bicycle tyre from a vulcanisation press according to the present invention. Such a description is given hereinafter with reference to the accompanying drawings, provided only for illustrative and, therefore, non-limiting purposes, in which:

FIGS. 1 to 4 schematically show cross-sectional views of some operating steps designed to build a green tyre for bicycle;

FIG. 5 schematically shows a transverse section view of a finished tyre for bicycle;

FIGS. 6 and 7 respectively show a perspective and side view of an apparatus for unloading a bicycle tyre from a vulcanisation press according to the present invention;

Figure 1:
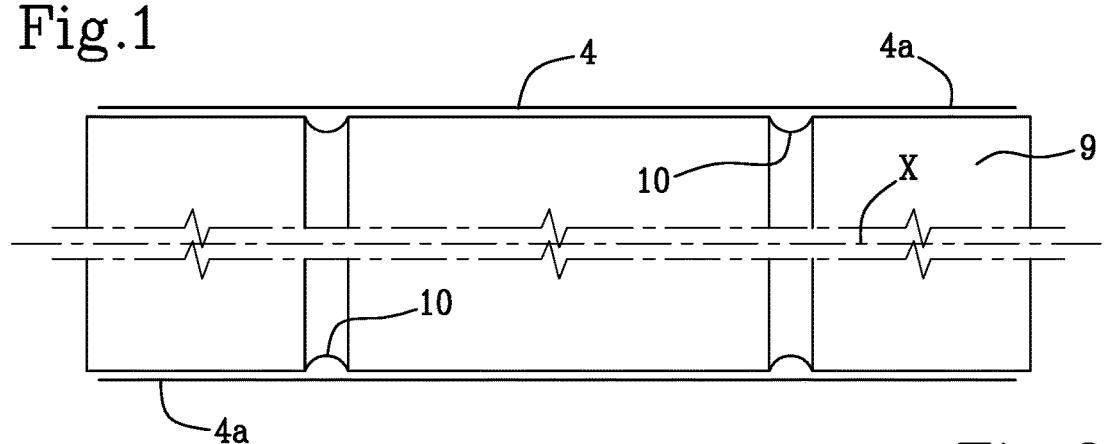
Figure 2:
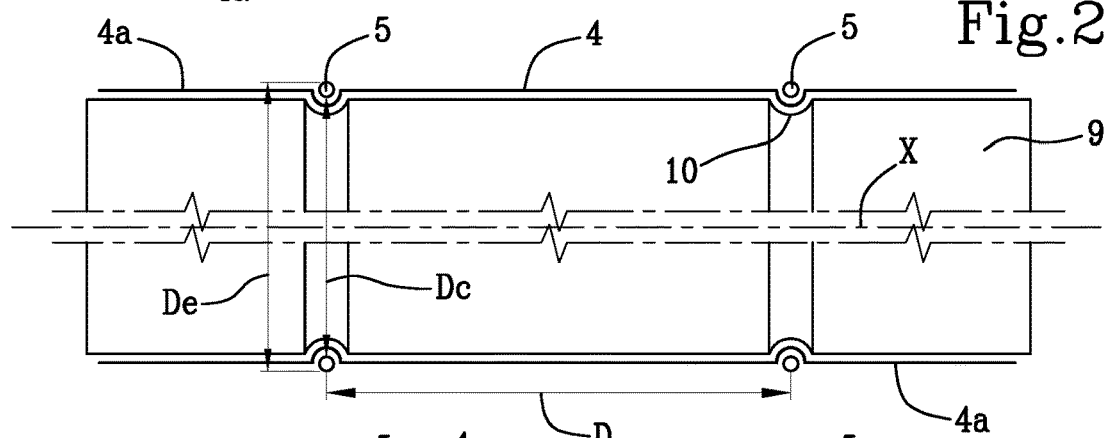

FIGS. 11a-11f schematically show an operational sequence of the apparatus in the preceding figures.

With reference to the accompanying figures, reference numeral 1 indicates an apparatus for unloading a bicycle tyre from a vulcanisation press.

Figure 5:
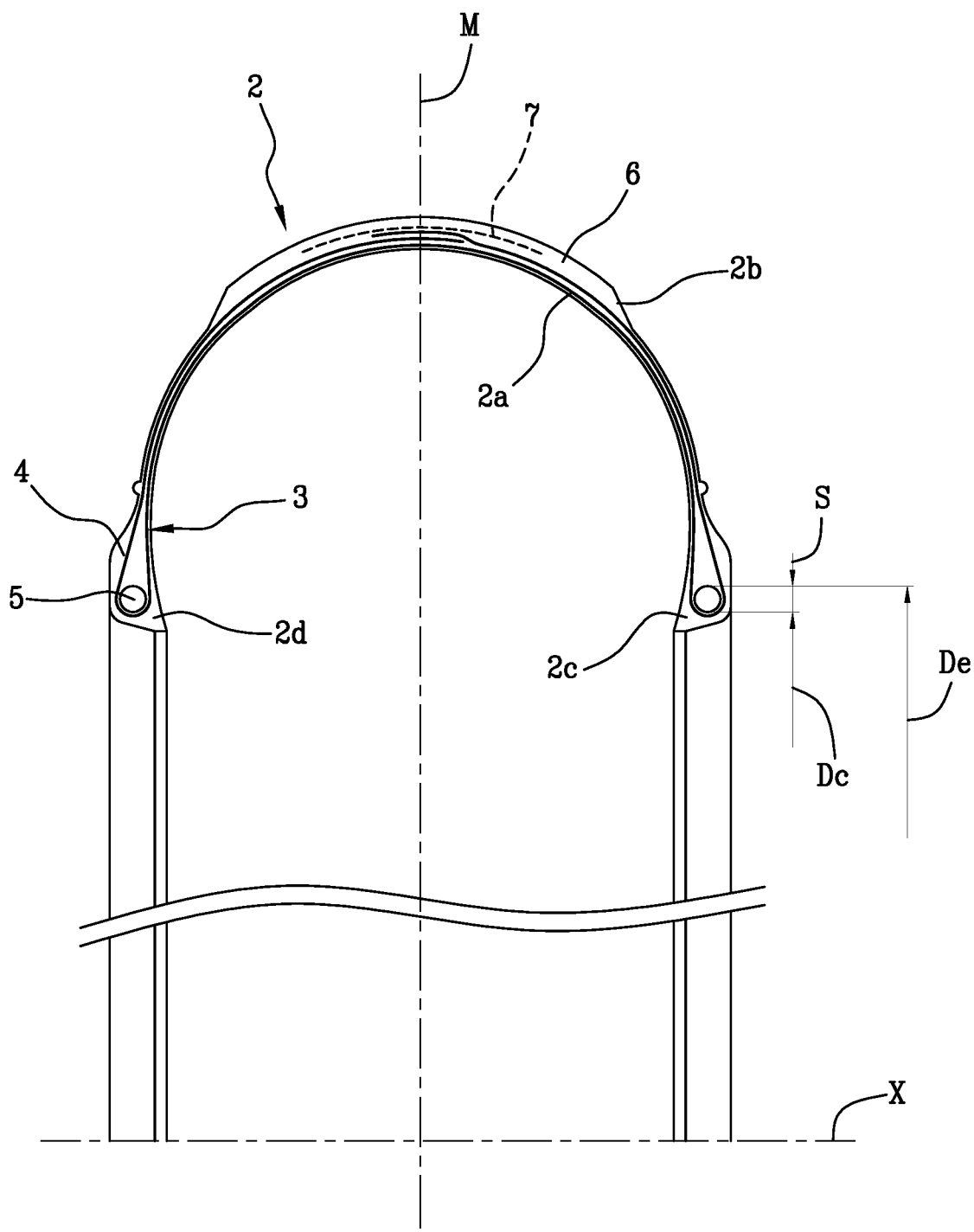

The present invention is designed for processing tyres 2 for bicycle, of the type schematically exemplified in FIG. 5, for example for use on road, track, mountain bikes, e-bikes, etc.

A radially inner surface 2a, concave and substantially facing towards a geometric axis of rotation X of tyre 2, and a radially outer surface 2b, convex and substantially facing away from the geometric axis of rotation X, can be identified in tyre 2.

Tyre 1 for bicycle has a carcass structure 3 comprising at least one carcass ply 4 having mutually parallel cords embedded in an elastomeric matrix.

Axially opposite end flaps 4a of the carcass ply or plies 4 are engaged to respective bead cores 5, that is, annular anchoring structures integrated in the regions usually identified by the name of "beads" at which the mechanical engagement between tyre 2 in use conditions and a respective mounting rim takes place.

A first radially inner edge 2c and a second radially inner edge 2d are therefore formed at the beads, respectively.

Apparatus 1 is configured for maintaining the geometric axis of rotation X of the tyre arranged transversely with respect to a horizontal geometric plane "O", preferably vertically.

Therefore, apparatus 1 according to the invention is configured for arranging tyre 2 so that the first edge 2c is placed at a lower height with respect to said second edge 2d along the geometrical axis of rotation X.

A tread band 6, made of elastomeric material, is applied in a radially outer position with respect to the carcass structure 3.

Preferably, at least two layers of cords having a cross pattern, respectively, can be identified in the carcass structure 3. The cords belonging to each layer have an inclined development according to a predetermined angle, approximately between about 35° and about 65° with respect to a circumferential development direction of tyre 2. For example, the presence of two carcass plies 4 may be provided, radially superimposed on top of each other, each with the respective cords extending along an inclined direction with respect to the circumferential development of tyre 2 and according to an inclined orientation with respect to the cords belonging to the other carcass ply 4.

Alternatively, as shown in FIG. 5, a single carcass ply 4 may be provided, the end flaps 4a whereof, turned up around bead cores 5, extend at least up to an axial centreline plane "M" of tyre 2, so as to define each a further radially outer layer of cords having crossed orientation with respect to the cords present in the radially inner layer.

Unlike the tyres typically designed to be used on motor vehicles, tyre 2 for bicycle is generally devoid of a belt structure, that is, of reinforcement belt layers radially interposed between the carcass structure 3 and the tread band 6. In tyres for motor vehicles, these belt layers contribute to increasing the structural strength of tyre 2 and to stabilising the geometry thereof, especially in the crown region, i.e. in the radially outer regions closer to the tread band 6.

In tyre 2 for bicycle, however, at least one circumferential protective layer 7 may be provided, interposed between the tread band 6 and the carcass structure 3. Where present, said at least one circumferential protective layer 7, the task whereof is essentially to protect tyre 2 from puncture, may have a textile structure or be made in the form of continuous layered tape of synthetic material, and preferably has a thickness not larger than about 0.5 mm, preferably not smaller than 0.2 mm. Unlike a real belt structure, the circumferential protective layer or layers optionally present in tyre 2 for bicycle do not significantly influence the structural strength, geometric stability and/or dynamic behaviour of tyre 2 itself.

Preferably, on the radially outer surface 2b of tyre 2 for bicycle, portions of carcass ply 4 directly exposed towards the external environment can be identified between the axially outer edges of the tread band 6 and the bead cores 5. Tyre 2 for bicycle is in fact typically not provided with sidewalls, i.e. layers of elastomeric material applied laterally outside the carcass structure 3, each extending between one of the beads and the respective axially outer edge of the tread band.

In tyre 2 for bicycle, thickness "S" of the bead core 5 corresponds to a half of the difference between an outer circumferential diameter "De" and the seating diameter "Dc" of bead core 5 itself.

As schematised in FIGS. 1 to 4, the building of tyre 2 for bicycle in fact provides that, using suitable application devices (not shown) forming part of a building unit, the carcass ply or plies 4 are deposited according to a cylindrical configuration, such as by wrapping around an outer surface of a building drum 9.

By means of bead core application devices (not shown), a pair of bead cores 5, for example made of composite material based on natural or synthetic fibres and/or more seldom, metallic material, is applied at a fixed mutual axial distance "D", each around one of the axially opposite end flaps 4a of the carcass ply 4.

In particular, in the example shown, it is provided that each bead core 5, previously made in the form of finished component, is first fitted around the carcass ply or plies 4 in an axial position corresponding to a circumferential recess 10 formed on the building drum 9 A slight radial expansion of the building drum 9, for example by lever mechanisms forming part of said bead core application devices, causes the application of the bead cores 5 against the carcass ply or plies 4, each at the respective circumferential recess 10.

Alternatively, the bead core application devices may be configured to make each bead core 5 directly on the building drum 9, wrapping one or more continuous cords around the carcass ply or plies 4 according to a plurality of coils axially juxtaposed and/or radially superimposed on each other.

Turning up devices (not shown) operating at the building drum 9 then turn up the end flaps 4a of the carcass plies 4 around the respective bead cores 5. During the turning up, the end flaps 4a may be at least partially superimposed on each other and optionally joined in mutual direct contact.

Tread band application devices (not shown) aid the application of a tread band 6 around the carcass ply 4, in an axially centred position with respect to the bead cores 5. The tread band 6 may be applied in radial superimposition with respect to the turned up end flaps 4a. Once the application has been completed, the turned up end flaps 4a may therefore be partly arranged in an axially inner position with respect to axially opposite edges of the tread band 6.

On occurrence, the application of the tread band 6 may be preceded by the application of said at least one circumferential protective layer 7.

Figure 3:
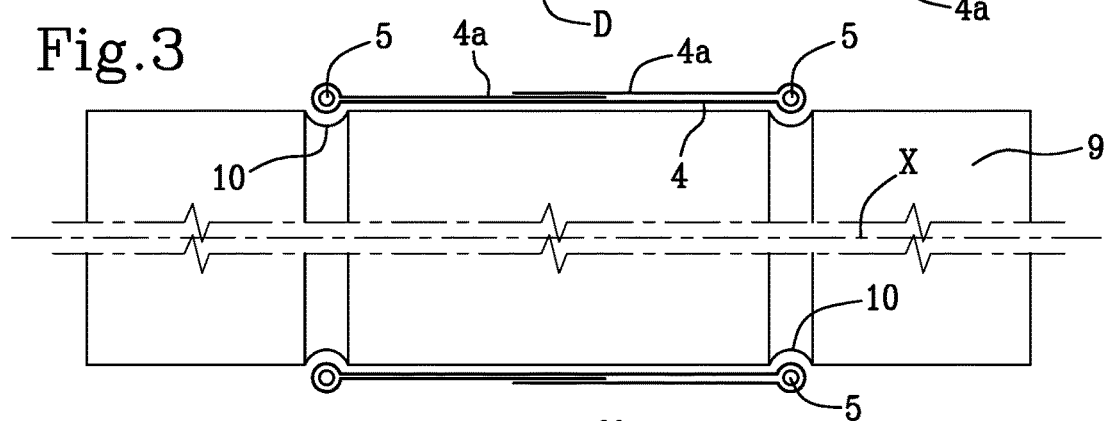
Figure 4:
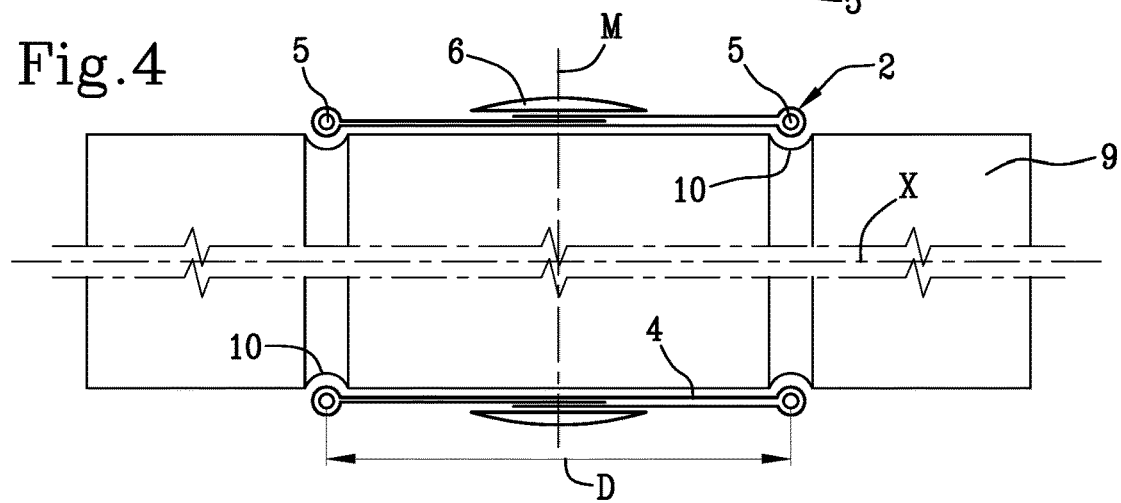

During the application of the tread band 6, an axially central portion of said at least one carcass ply 4, extending axially through an axial centreline plane "M" equidistant from the bead cores 5, lies against the building drum 9 (FIGS. 3-4).

The tread band 6 is preferably applied maintaining the mutual axial distance "D" of the bead cores 5 virtually unchanged. More in particular, the mutual axial distance "D" between the bead cores 5 preferably remains unchanged during the entire building process, including the application of the tread band 6.

Once the building has been completed, the green tyre 2 is removed from the building drum 9 to be subjected to other process steps, for example to be transferred to a vulcanisation mould or press 100.

The present invention aims to allow the handling and unloading of the tyre from the vulcanisation press 100 following the vulcanisation.

It should be noted that the vulcanisation press 100 preferably comprises a pair of half-moulds 100a, 100b mutually movable in axial approach and distancing for delimiting the vulcanisation chamber.

In particular, press 100 comprises a lower half-mould 100a and an upper half-mould 100b.

Once the vulcanisation has been completed, the two half-moulds 100a, 100b open to allow the unloading of the vulcanised tyre 2. Tyre 2 to which reference is made in the present text therefore is a tyre already vulcanised, the numeral references whereof have for simplicity been kept unchanged with respect to those of the green tyre, described with reference to the building step.

The unloading apparatus 1 according to the present invention provides the presence of a retaining device 11 of tyre 2 and an unloading device 12 configured for picking tyre 2 from the retaining device 11 and releasing it at an unloading station U.

The retaining device 11 is provided with an operating axis Y and comprises with an active portion 11a configured for exerting a thrust action on the radially inner surface 2a of tyre 2 directed radially away from the operating axis Y.

Such an action allows maintaining tyre 2 in a work region Z placed at an operating height H.

Therefore, the retaining device 11 is configured to act on the radially inner surface 2a of the tyre from the interior. In other words, the active portion 11a of the retaining device 11 performs a radial action that from the operating axis Y is directed with a radially outer direction towards such a radially inner surface 2a.

It should be noted in this regard that the expression "operating axis" in the present text is meant to define the reference axis of the retaining device 11 oriented in a concordant manner, preferably parallel, to the geometric axis of rotation X of tyre 2.

In the preferred embodiment, during the retraining action by the retaining device 11, the geometric axis of rotation X of tyre 2 and the operating axis Y are substantially coincident.

The "operative height H" is defined as the reference height at which tyre 2 is placed to prepare it for a subsequent unloading step.

The "work region" is instead defined as the volume occupied by the tyre as when placed the working height.

Preferably, the retaining device 11 comprises a central body 13 and a radially expandable peripheral portion 14.

The peripheral portion 14 defines the active portion 11a and is configured for generating the thrust action on the radially inner surface 2a of tyre 2.

In this way, the radial handling of the active portion 11a is limited, to the advantage of the operating speed and accuracy of the retaining device 11.

Preferably, the radially expandable peripheral portion 14 of the retaining device 11 comprises at least one deformable membrane 15.

Such a deformable membrane 15 is expandable from a contracted condition to an expanded condition, in which it is substantially counter-shaped to the radially inner surface 2a of tyre 2.

Advantageously, the use of a deformable membrane allows limiting the risk of damage of tyre 2 and, at the same time, facilitating the adaptation of the active portion 11a to the radially inner profile of tyre 2.

It should also be noted that, preferably, the central body 13 of the retaining device 11 has a smaller radial footprint (or extension) with respect to the radially inner edges 2c, 2d of tyre 2.

Advantageously, in this way, the central body 13, when the deformable membrane 15 is in the contraction condition, is easily axially insertable and removable into/from tyre 2.

In this regard, in the preferred and illustrated embodiment, the retaining device 11 is defined at least in part by a central body of a vulcanisation press 100.

Advantageously, in this way it is possible to use the equipment already present in the vulcaniser, thus simplifying the integration of apparatus 1 with the already existing vulcanisation systems.

Figure 11A:
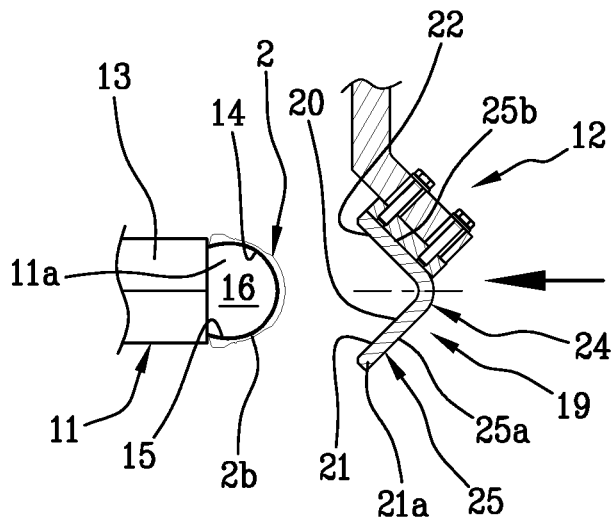
Figure 11B:
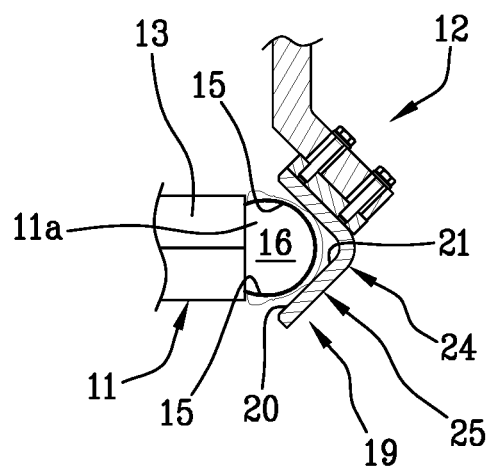
Figure 11C:
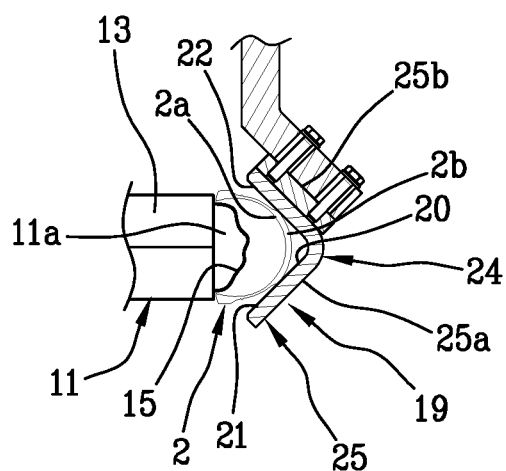
Figure 11D:
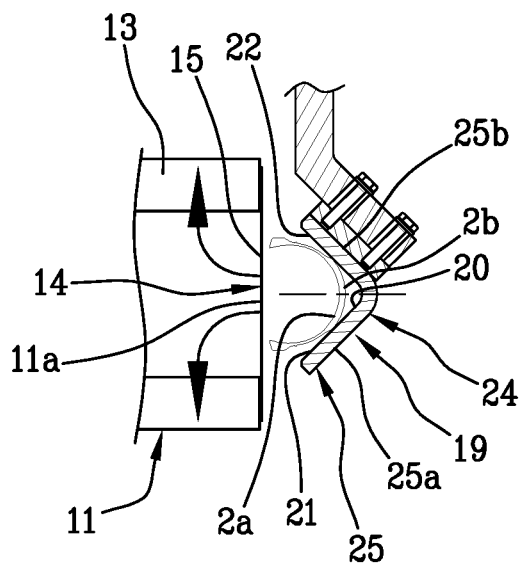

Therefore, with reference to FIG. 11a, it is possible to appreciate that the peripheral portion 13 of the retaining device 11 comprises an annular chamber 16 delimited in a radially outer position by said deformable membrane 15.

Such an annular chamber 16 is placed in fluid connection with a source of a fluid under pressure in order to control the expansion or contraction of membrane 15.

In the preferred embodiment, the retaining device 11 is axially movable from a lower vulcanisation height to the upper operating height H.

Therefore, lifting means 17 are provided, connected to the retaining device 11 and configured for translating it vertically from the vulcanisation height, in which the retaining device 11 lies within a lower half-mould of the press, to the operating height H, in which the retaining device 11 is raised with respect to said lower half-mould.

Preferably, the lifting means 17 comprise a hydraulic or pneumatic cylinder provided with a piston constrained to the retaining device 11.

Advantageously, such a handling facilitates the vulcanised tyre unloading operations, by facilitating the "in-air gripping" (as will be better explained hereinafter).

The possibility to carry out the lifting of tyre 2 in fact frees space inferiorly and externally to the same, thus simplifying the positioning of the unloading equipment.

The unloading device 12 comprises at least one frame 18 and a support member 19 of tyre 2 arranged around a loading axis A.

It should be noted that the expression "loading axis" in the present text is meant to define the reference axis of the unloading device 12, i.e. the axis which is taken as reference for the movement and centring of the unloading device 12 itself with respect to the retaining device 11 (and the tyre).

Preferably, the loading axis A is an operating axis of the unloading device 12, around which the support member 19 is arranged in substantial central symmetry.

Therefore, the unloading device 12 is selectively movable towards and away from the operating axis Y for aligning the loading axis A with the operating axis Y itself (as will be better clarified hereinafter).

The support member 19 is selectively movable with respect to frame 18 approaching the work region Z until reaching an operating position located in a radially outer position to said central body 13 of the retaining device 11.

Preferably, when it is in the operating position, the support member 19 is placed in a radially outer position with respect to said active portion 11a of the retaining device 11.

More precisely, in the operating position, the support member 19 is placed in a region close to the radially outer surface 2b of tyre 2, preferably in a radially outer position with respect thereto. In this region, the support member 19 may be in contact with said radially outer surface 2b or come into contact with said radially outer surface 2b as soon as the retaining device 11 stops the thrust action thereof.

In other words, the unloading device 12 is configured to carry out two independent handling operations:
- a centring, in which the whole unloading device 12 (both frame 18 and the support member 19) moves towards the operating axis Y of the retaining device 11 (up to the centring of the loading axis A);
- a radial positioning (or contraction), in which the support member 19 moves with respect to frame 18 to approach the radially outer surface 2b of tyre 2 until it reaches the operating position.

Advantageously, the synergistic effect resulting from the presence of a retaining device 11 capable of imparting a certain position to tyre 2 together with one or more support members 19 circumferentially distributed around tyre 2 allows making the unloading procedure of the vulcanised tyre from the press unique and predetermined, and thus easily controllable and automatable.

Furthermore, the solution presented herein, in which the support member 19 approaches the tyre from the exterior, allows using the wide spaces available outside the radial footprint of the vulcanisation press, without having problems of mechanical interference between parts in mutual movement.

The Applicant also believes that by dividing the movement of the support member 19 in a centring stroke and a radial positioning it is possible to obtain an apparatus which optimises the overall dimensions and optimises the placement of each support member in the operating position.

The support member 19 is therefore provided with a contact surface 20 which, in the operating position, has at least one supporting portion 21 facing upwards.

In particular, in the operating position the supporting portion 21 is placed at an axially lower position to the corresponding tyre portion in direct support thereon.

Preferably, the supporting portion 21 extends from a free end 21a which, in said operating position, is arranged at a radially lower position to the active portion 11a of the retaining device 11 (and tyre 2).

Advantageously, by arranging the supporting portion 21 at a lower height with respect to the radially inner edges of tyre 2, there is the guarantee of supporting it even in case the deformability thereof bends such edges inferiorly.

In the preferred embodiment, the contact surface 20 also has a containment portion 22 configured to define a radial retaining of tyre 2.

Advantageously, this allows imparting not only a bottom support, but also a radial containment to tyre 2, thus favouring the stability thereof in the unloading step.

More precisely, the supporting portion 21 is configured to contact a first radially outer half-part, axially lower, of tyre 2; the containment portion 22 is arranged with respect to the supporting portion 21 so as to contact a second radially outer half-part, axially upper of tyre 2.

In this regard, in certain embodiments the containment portion 22 rises on the continuation of the supporting portion 21 and is located in a radially outer position with respect to the supporting portion 21.

Preferably, according to the illustrated embodiments, the containment portion 22 is at least partly substantially facing the supporting portion 21, spaced therefrom, to come into contact with the upper half-part of the tyre.

Preferably, the containment portion 22 defines an angle of between about 60° and about 150° with the supporting portion 21.

Preferably, the contact surface 20 of the support member 19 has a concave shape. In particular, the contact surface 20 has a concave axial development.

Advantageously, such a shape defines a cradle for receiving and radially retaining the tyre, operating in the vicinity of an axially lower portion of the radially outer surface of the tyre itself. Such a support member is therefore able to support the tyre also exerting a containment action of the deformation thereof.

Therefore, in said operating position, the contact surface 20 at least partially circumscribes tyre 2 in engagement with the retaining device 11.

In other words, the supporting portion 21 and the containment portion 22 define the two opposite sides of the concavity delimiting a housing volume of tyre 2.

In order to handle the support member 19 with respect to frame 18, or in order to provide for the radial positioning, the unloading device 12 comprises a handling group 23.

The handling group 23 is therefore operatively interposed between frame 18 and the support member 19 and configured for translating said support member 19 towards the operating position.

More precisely, the handling group 23 is configured for handling said support member 19 from a position distal from the operating axis Y of the retaining device 11 to a position proximal to said operating axis Y, corresponding to the operating position.

In other words, in use, the handling group 23 moves the support member 19 from a distal position with respect to the radially outer surface 2b of tyre 2 to a position proximal to, preferably in contact with, said radially outer surface 2b.

Therefore, the handling group 23 is configured for guiding said support member 19 towards the operating position according to a handling path having at least one radial component directed in approach to the retaining device 11.

Therefore, the handling group 23 is configured to contract the support member from a radially expanded condition to a radially contracted condition.

Advantageously, in this way, the support member 19 is positioned around the tyre through the "centring" movement of the unloading device 12 and subsequently (or simultaneously) contracted, so as to embrace in a circumferentially distributed manner the radially outer surface thereof, thus promoting the stability of the loading.

Preferably, the contraction trajectory is oriented orthogonally to said operating axis Y (and preferably to the loading axis A).

More preferably, the contraction trajectory extends in a plane perpendicular to said operating axis Y.

In order to facilitate the contractibility of the support member 19, it comprises a plurality of support sectors 24 mutually angularly spaced around the loading axis A.

Preferably, with reference to the embodiment shown, sectors 24, at least in the operating position, are mutually angularly equidistant.

Advantageously, the structure in sectors 19 has enabled the Applicant to achieve an efficient unloading device 12 capable of circumferentially distributing its support action, thus maximising stability of the tyre in the loading step while minimising the overall dimensions.

In certain embodiments, not illustrated, the sectors each have a curved development around the loading axis A, in order to accommodate a circular arc of tyre 2.

Preferably, however, in the illustrated embodiment, the sectors have limited and straight circumferential development.

This is particularly advantageous for the standardisation of the apparatus, since the efficiency of the sectors remains unchanged as the diameter of tyre 2 varies.

In the preferred embodiment, each sector is defined by a plate 25 shaped as an "L", i.e. provided with a first plate 25a and a second plate 25b, mutually angled.

Therefore, each sector 24 has a concave axial development thereof.

Preferably, such plates 25a, 25b define, in a vertical plane passing by the loading axis A, an angle of between about 60° and about 150°, more preferably about 90°.

In the operating position, the first plate 25a is placed at an axially lower position with respect to the second plate 25b.

Therefore, the first plate 25a has an operating face in part defining the supporting portion 21 of the contact surface 20.

Likewise, the second plate 25b has an operating face in part defining the containment portion 22 of the contact surface 20.

Therefore, the handling group 23 is configured for contracting the unloading device 12 from a radially expanded condition, in which sectors 24 of the support member 19 are mutually moved apart, to a radially contracted condition, in which sectors 24 of the support member 19 are mutually approached; the radially contracted condition corresponding to the operating position of the support member 19.

Preferably, the handling group 23 comprises at least one actuator 26 and a motion transmission system 27 operationally interposed between actuator 26 and sectors 24.

Actuator 26 may be either electrical or hydraulic, rotary or linear.

The transmission system 27 is configured as a function of the type of actuator in order to transform the linear or rotary motion of actuator 26 in a radial contraction and expansion motion of sectors 24.

Preferably, the motion transmission system 27 comprises a plurality of runners 28, each associated with at least one sector 24, slidably associated with a corresponding plurality of guides 29 (in sliding or rolling contact).

Guides 29 are preferably oriented along a radial direction with respect to the loading axis A.

It should be noted that guides 29 are constrained to frame 18 of the unloading device 12 and therefore, during the radial positioning (i.e. during the movement of the handling group 23), they do not undergo any movement.

Therefore, the handling group 23 is configured to impart a radial displacement to runners 28 along guides 29.

To this end, the motion transmission system 27 preferably comprises a cam mechanism 30 operatively interposed between actuator 26 and runners 28.

More specifically, in the illustrated embodiment, the transmission system 27 comprises a disc 31 rotatably associated with frame 18 of the unloading device 12 to rotate, with respect thereto, around the loading axis A.

To this end, frame 18 is provided with a circular guide 32 to which disc 31 is slidably associated.

Through slots 33, suitably shaped, are formed on disc 31. Each runner 28 is constrained in sliding along said slots 33, preferably by means of a pin and an axial locking element.

Each slot 33 therefore defines a cam surface for the pin of the respective runner 28.

In the preferred embodiment, each slot develops between a radially outer end 33a and a radially inner end 33b, preferably along a direction that defines an acute angle with a radial direction passing by the radially outer end 33a. It should be noted that the "radial direction" is assessed starting from the loading axis A.

The development direction of each slot 33 therefore has at least one radial component for allowing the translation of runner 28 along guide 29, and a circumferential component for allowing the rotation of disc 31.

Advantageously, in fact, since runner 28 is slidably constrained to guide 29 and to slot 33, the rotation of disc 31 around the loading axis A imparts to the runner, through the cam surface of slot 33, a radial translation along guide 29.

In order to set disc 31 in rotation, a rotary actuator or a linear actuator may be used.

In the preferred embodiment, actuator 26 is of linear type associated to disc 31 so that a translation thereof corresponds to a rotation of the same.

Figure 6:
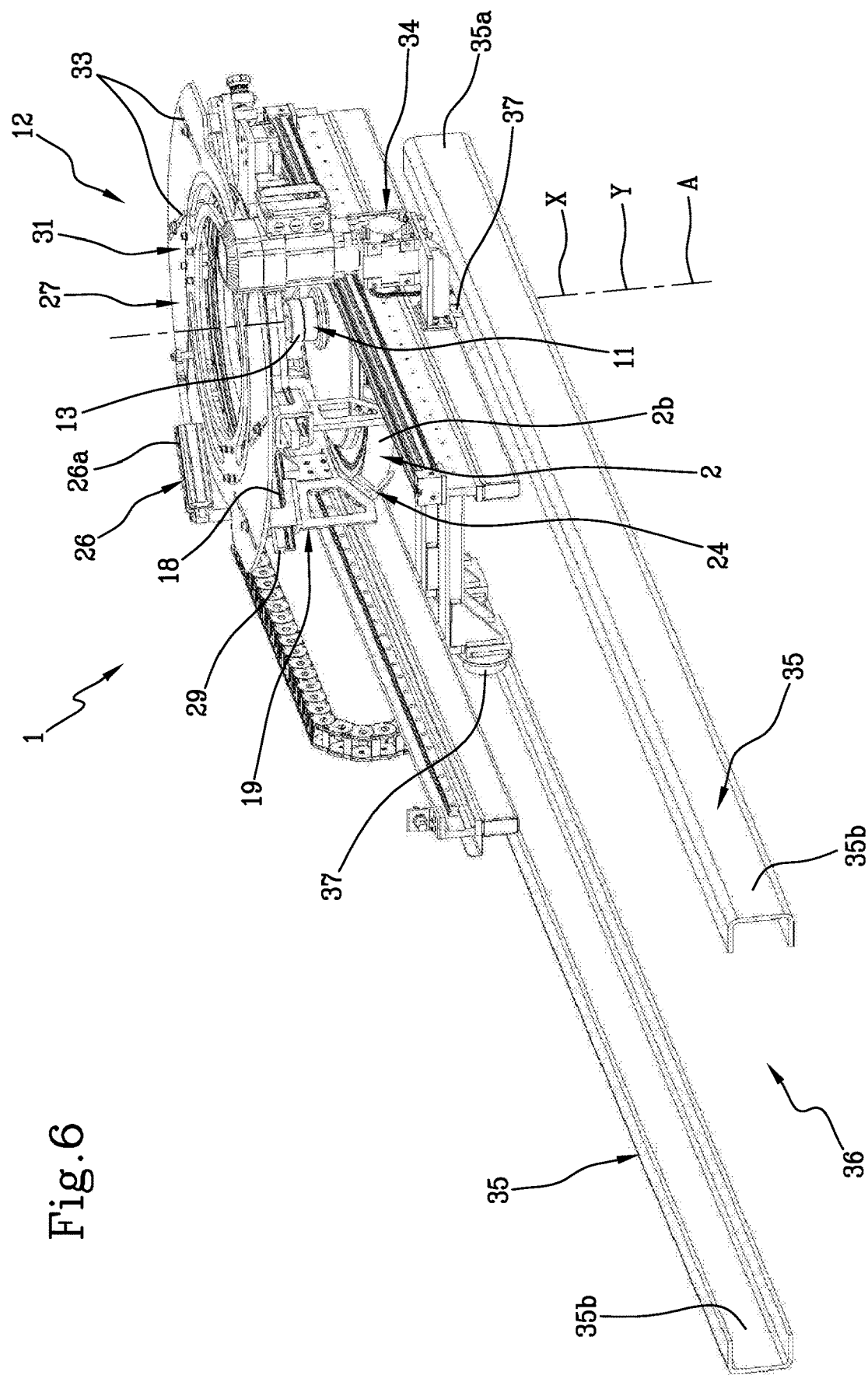
Figure 7:
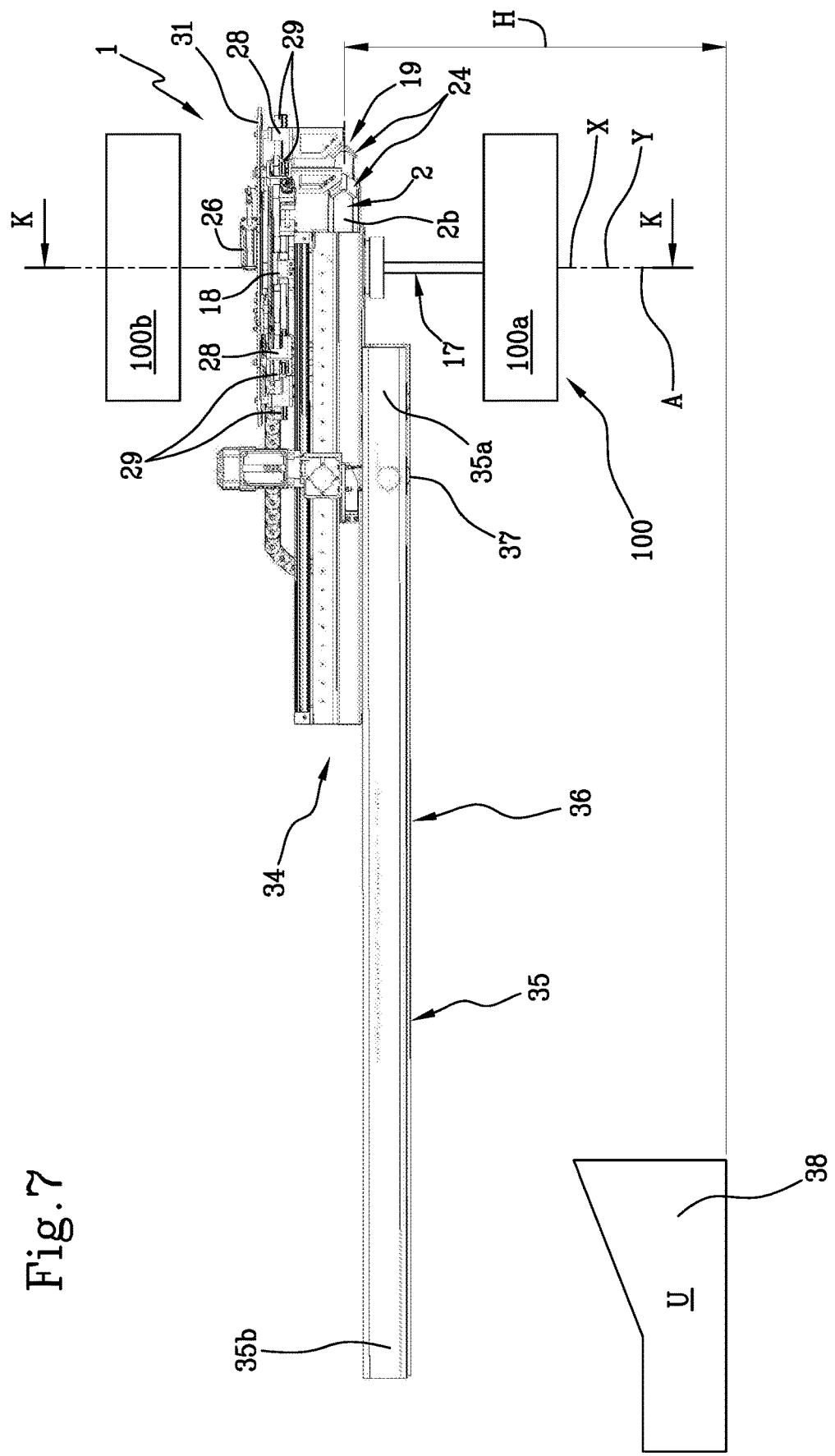
Figure 8:
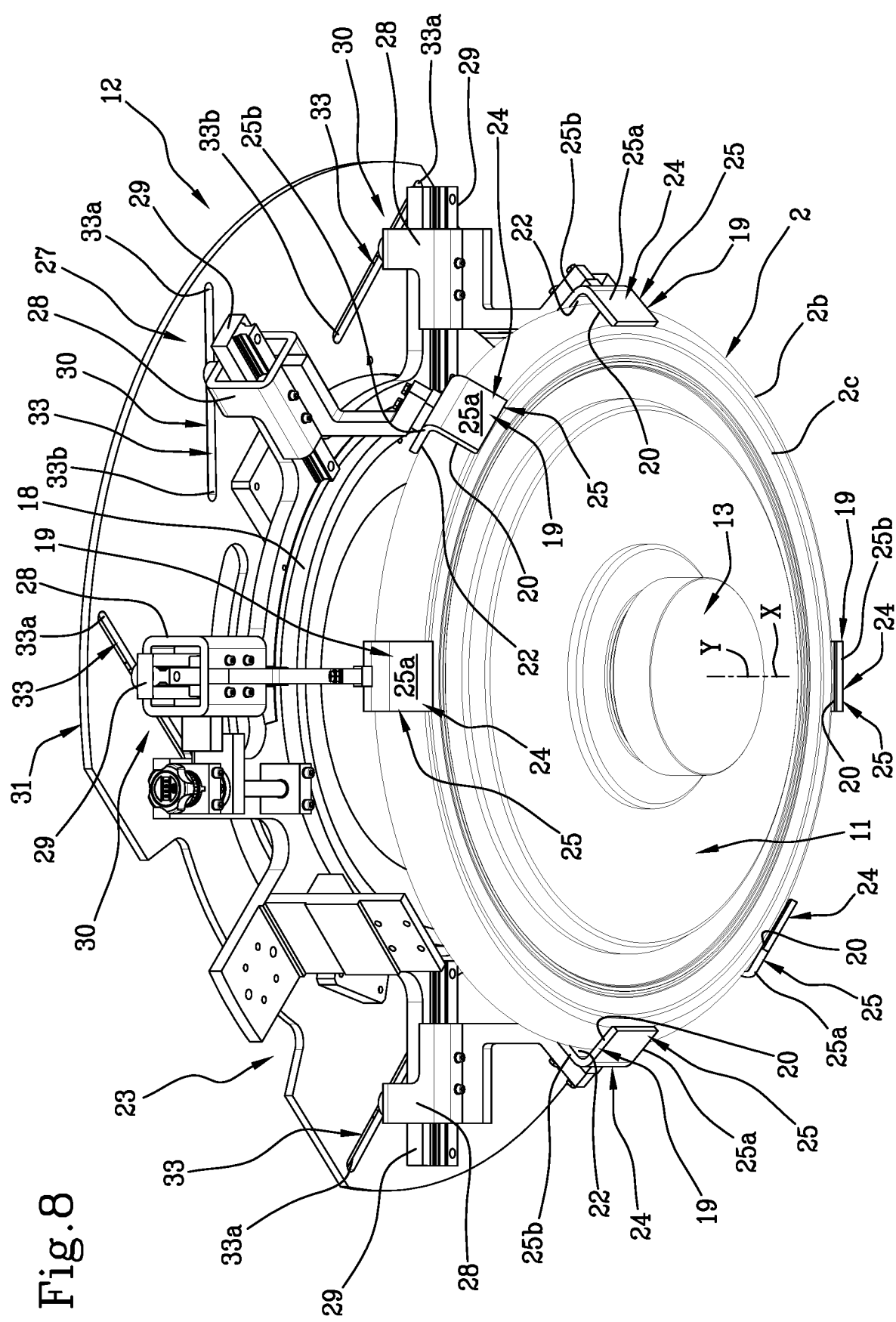
FIGS. 8 and 9 shows respectively top and bottom perspective views of a detail of the apparatus in FIGS. 6 and 7.
Figure 9:
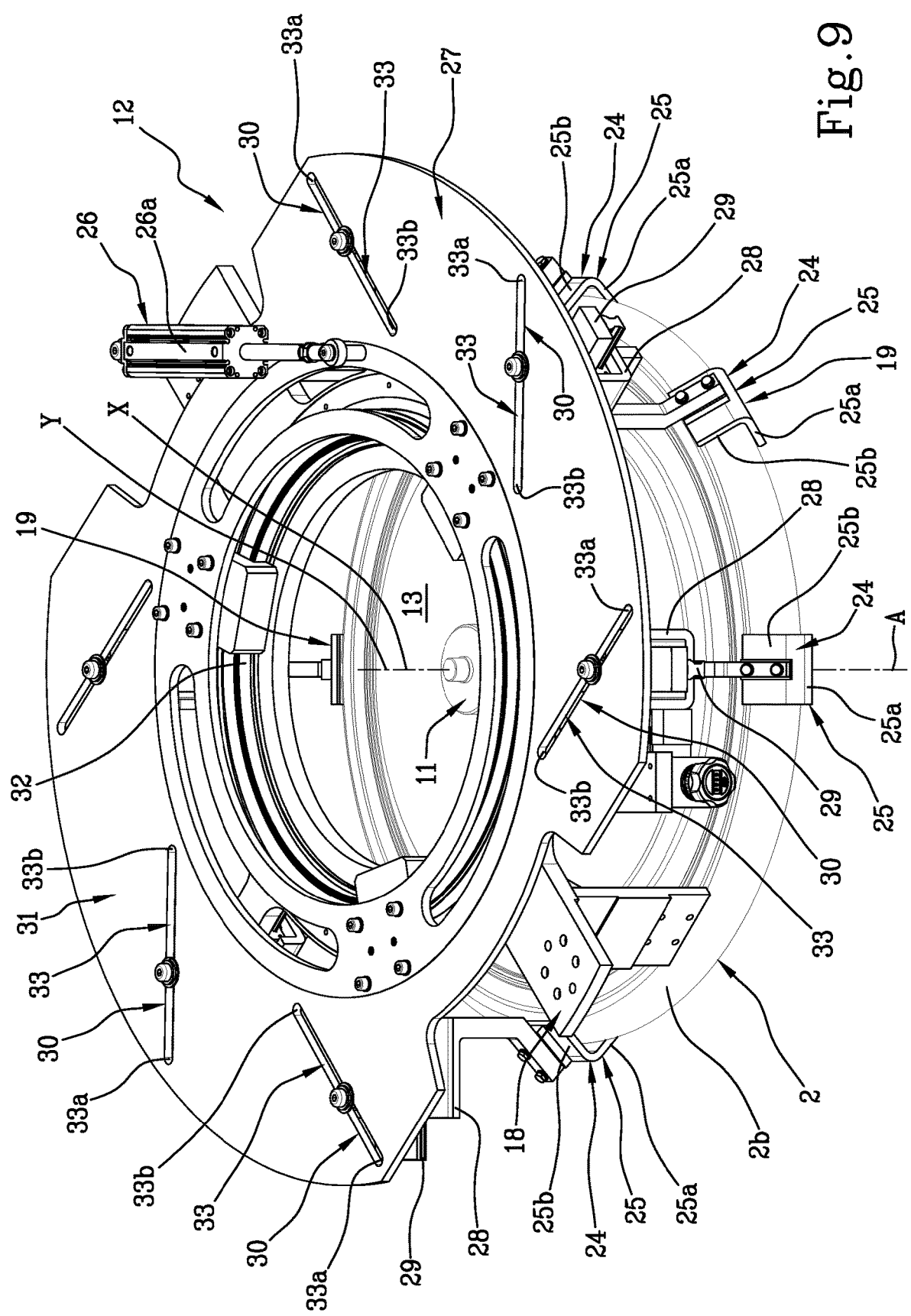
Figure 10:
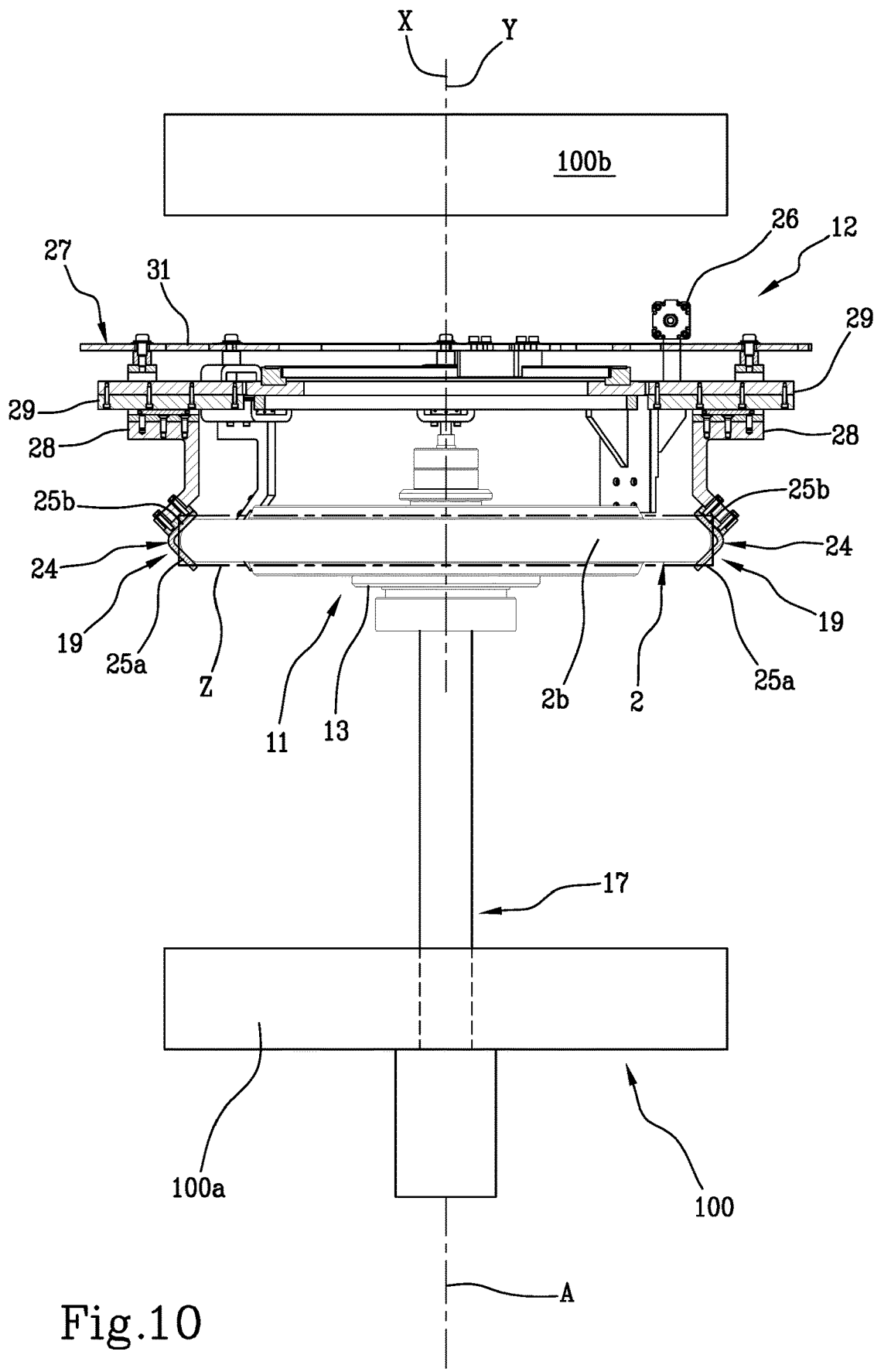
FIG. 10 shows a sectional view according to the section line K-K in FIG. 7.

With reference to FIGS. 6, 7 and 9, actuator 26 is a hydraulic cylinder 26a hinged on one side to frame and on the other to disc 31, preferably to a peripheral portion thereof in order to minimise the force required by rotation.

In an alternative embodiment, the motion transmission system instead comprises a plurality of radial arms hinged to the frame and connected, at a free end thereof, to a respective sector.

In this way, a rotation of the arm around the connecting pin with the frame corresponds to a movement of the free end approaching or distancing from the operating axis Y.

Apparatus 1 further comprises a translating group 34 associated to the unloading device 12 and configured for translating it transversely to said operating axis Y of the retaining device 11.

The translating group 34 is preferably configured for handling the unloading device 12 between a position radially distal from the operating axis Y and a position radially centred (i.e. aligned) with said operating axis.

Preferably, the translating group 34 comprises at least one crosspiece 35 extending away from the operating axis Y of the retaining device 11, more preferably along a substantially radial direction.

Such a crosspiece 35 extends between a radially proximal end 35a of the operating axis Y and a radially distal end 35b of the operating axis Y.

In the preferred embodiment, the crosspieces are two, parallel, and define a guide rail 36 for frame 18 of the unloading device 12.

To this end, frame 18 of the unloading device 12 is slidably associated to crosspiece 35 for moving between said radially distal position and said radially proximal position to the operating axis Y.

Preferably, frame 18 is associated (more precisely constrained) with at least one carriage 37 slidably associated with each crosspiece; more preferably, at least one carriage 37 is motorized to impart the motion along the guide to frame 18 (and simultaneously to the support member 19).

Alternately, however, actuation systems of a different type may be provided, such as linear or coupling (e.g. rack and screw/nut).

At the radially distal end 35b of crosspiece 35, apparatus 1 preferably comprises at least one collector 38 placed at an unloading station U and adapted to receive tyre 2 released by the unloading device 12, in particular by the support member 19, once the radially distal position has been reached.

In use, apparatus 1 as described above allows implementing a process for unloading a vulcanised bicycle tyre from a vulcanisation press according to the present invention.

Such a process provides for retaining tyre 2 at the operating height H by exerting a thrust action on the radially inner surface 2a of tyre 2 directed radially away from the geometric axis of rotation X of tyre 2 itself.

This action is preferably carried out by means of the retaining device 11 described above.

Therefore, the radially expandable peripheral portion 14 of the retaining device 11 is expanded up to contacting in thrust the radially inner surface 2a of the tyre.

More precisely, chamber 16 is pressurised and membrane 15 inflated so as to radially expand it up to contact the radially inner surface 2a of tyre 2.

The action of the retaining device 11 is distributed in a manner substantially symmetrical to the operating axis Y, which substantially coincides with the geometric axis of rotation X of tyre 2.

Preferably, simultaneously with the retaining action, tyre 2 is lifted from a vulcanisation height to said operating height H.

At the vulcanisation height, the tyre is into the lower half-mould 100a of the vulcanisation press 100.

Such a lifting is carried out by vertical translation of the retaining device 11.

Therefore, the retaining device is lifted from the vulcanisation height to the operating height H in order to facilitate cooperation between the central body of the vulcaniser and the unloading device 12.

The unloading device 12 is thus positioned with respect to tyre 2 by aligning the loading axis A with the geometric axis of rotation X of tyre 2 (and thus with the operating axis Y of the retaining device 11).

More precisely, positioning the unloading device 12 comprises translating said unloading device 12 along a centring path towards said geometric axis of rotation X from a radially outer position with respect to the tyre.

Such a position can thus be considered a centring of the unloading device 12 with respect to tyre 2.

It should be noted that as a result of the centring, the unloading device 12, and in particular frame 18, is arranged above the retaining device 11.

This clearly simplifies constructively and functionally the implementation of apparatus 1 and the implementation of the process.

The centring is aimed at providing a fixed reference to the unloading device 12 placed in the vicinity of the geometric axis of rotation X of tyre 2, thus allowing limiting the stroke of the support member 19, as already noted in describing the structure of apparatus 1.

It should be noted that since the vulcanised tyre 2 has a limited deformation but still greater with respect to the green tyre, the centring may also be carried out without the aid of mechanical centring systems (such as wedges) since any small deviations from the perfect alignment would not affect the effectiveness of the procedure.

During or after the placement (i.e. centring), the support member 19 of the unloading device 12 is moved with respect to frame 18 and in approach to the radially outer surface 2b of tyre 2.

Such a handling continues up to reaching a n operating position.

Therefore, in the operating position, the support member 19 partially circumscribes at least an axially lower portion of said tyre, extending from said first radially inner edge.

Preferably, upon reaching the operating position, the contact surface 20 of the support member 19 contacts the radially outer surface 2a of tyre 2.

The handling of the support member 19 with respect to frame 18 of the unloading device 12 involves translating the support member 19 from a rest position towards the operating position along a handling path directed in approach to the radially outer surface 2b of tyre 2.

In this regard, it should be noted that preferably, the positioning of the unloading device 12 comprises arranging the unloading device 12 itself with respect to tyre 2 so that the support member 19 is placed in the rest position.

Advantageously, in this way, the two movements of positioning of the unloading device 12 and contraction of the support members are uncoupled, thus simplifying both the kinematics and the handling control.

The handling path comprises at least one contraction stroke extending between a radially outer distal position with respect to the geometric axis of rotation X of tyre 2 and a position proximal to said geometric axis of rotation X, corresponding to said operating position.

As already briefly mentioned above, preferably the contraction stroke is oriented orthogonally to the geometric axis of rotation Z of tyre 2; more preferably, the whole handling path of the support member 19 with respect to frame 18 develops in a plane orthogonal to said geometric axis of rotation X.

In this light, the placement of the unloading device 12 provides for arranging the unloading device 12 itself with respect to tyre 2, i.e. to the retaining device 11, so that the support member 19 is substantially placed at said operating height H of tyre 2, in a radially outer position thereto.

The handling of the support member 19 with respect to frame 18 can therefore be considered a contraction of the support member 19 on tyre 2 from a radially expanded condition to a radially contracted condition, corresponding to the operating position.

More precisely, sectors 24 of the support member 19 described above, are moved in mutual approach from the radially expanded condition to the radially contracted condition to move to the operating position.

Operatively, after or simultaneously with the centring, actuator 26 is operated so as to impart, by means of the transmission system 27, the contraction to sectors 24.

As already discussed in relation to apparatus 1, when in the operating position, the support member 19 has a contact surface 20 of tyre 2 at least partly facing upwards.

In fact, in such an operating position, the contact surface 20 of the support member 19 is located at least partially below a side portion of tyre 2 extending radially away from the first radially inner edge 2c to support it resting.

More preferably, the contact surface 20 of the support member 19 is at least in part located in an axially lower position with respect to such a first radially inner edge 2c.

In this way, at least a portion of the support member supports the tyre in complete support, thus eliminating the need for complex retention equipment in suspension.

Once the operating position has been reached, the radial thrust action by the retaining device 11 is interrupted to release tyre 2 on the contact surface 20 of the support member 19 of the unloading device 12.

In particular, tyre 2 rests with the radially outer surface 2b thereof on the contact surface 20 of the support member 19.

Therefore, upon reaching the operating position by the support member 19 (thus sectors 24), the pressure inside chamber 16 is reduced and the deformable membrane 15 is stretched, in order to release the radially inner surface 2a of tyre 2.

In particular, the peripheral portion 14 of the retaining device 11 is radially contracted so that the entire retaining device 11 is placed in a radially inner position to the radially inner edges 2c, 2d of the tyre.

In this way, it is possible to axially extract the retaining device 11 from the tyre.

This extraction can be done by lifting the support member 19 above the operating height H, or preferably by lowering the retaining device 11 from the operating height H to a lower height (preferably that of vulcanisation).

In this way, the support member 19 can be handled in radial direction with respect to the geometric axis of rotation X of tyre 2 without obstacles.

Once the retaining device 11 has been extracted from tyre 1, the latter is transferred to an unloading station U by means of a displacement of the unloading device 12 from a loading position, corresponding to the operating position of the support member 19, to an unloading position.

Operationally, carriage 37 (or carriages) is operated so as to move it along crosspiece 35 (or crosspieces) from the radially proximal end 35a to the radially distal 35b one.

Upon reaching the unloading position, the support member 19 is again expanded, or returned from the operating position to the rest position, so as to release the tyre by dropping in the unloading station U.

The invention claimed is:

1. A process for unloading a vulcanised bicycle tyre from a vulcanisation press, wherein the tyre comprises: a concave radially inner surface and a convex radially outer surface, both of which extend between a first radially inner edge and a second radially inner edge of the tyre and the tyre is arranged with a geometric axis of rotation thereof arranged transversely to a horizontal plane, wherein the first edge is placed at a lower height with respect to the second edge of the tyre, the process comprises:
retaining the tyre by exerting a thrust action on the radially inner surface of the tyre directed radially away from the geometric axis of rotation with a retaining device;
arranging an unloading device provided with at least one frame and at least one support member of the tyre, wherein the at least one support member is arranged around a loading axis and movable with respect to the frame;
positioning the unloading device with respect to the tyre to align the loading axis with the geometric axis of rotation of the tyre;
moving the support member with respect to the frame and towards an operating position in which the support member is next to the radially outer surface of the tyre;
interrupting the radial thrust action of the retaining device on the radially inner surface of the tyre for releasing the tyre with the radially outer surface thereof on a contact surface of the support member handled in the operating position.

2. The process as claimed in claim 1, wherein upon reaching the operating position, the contact surface of the support member is located at least partially below an axially lower portion of the tyre extending radially away from the first radially inner edge of the tyre.

3. The process as claimed in claim 1, wherein in the operating position, the contact surface of the support member is located in a lower position with respect to the first radially inner edge of the tyre.

4. The process as claimed in claim 1, wherein in the operating position, the support member has a supporting portion facing upwards.

5. The process as claimed claim 1, wherein in the operating position, the contact surface of the support member at least partially circumscribes the axially lower portion of the tyre extending from the first radially inner edge of the tyre.

6. The process as claimed in claim 1, wherein the contact surface of the support member is concave.

7. The process according to claim 1, wherein upon reaching the operating position, the support member contacts the radially outer surface of the tyre.

8. The process as claimed in claim 1, wherein the support member handled in the operating position involves translating the support member from a rest position towards the operating position along a handling path approaching to the radially outer surface of the tyre.

9. The process as claimed in claim 8, wherein the handling path comprises at least one contraction stroke extending between a radially outer distal position with respect to the geometric axis of rotation of the tyre and a proximal position to the geometric axis of rotation.

10. The process as claimed in claim 8, wherein positioning the unloading device comprises arranging the unloading device itself with respect to the tyre in order to have the support member placed in the rest position.

11. The process as claimed in claim 10, wherein the retaining device is configured for retaining the tyre at a predetermined operating height and the rest position of the support member is substantially placed at the operating height of the tyre, in a radially outer position thereto.

12. The process as claimed in claim 8, wherein the handling path of the support member is configured for a contraction of the support member on the tyre from a radially expanded condition to a radially contracted condition.

13. The process as claimed in claim 12, wherein the support member comprises a plurality of support sectors mutually and angularly spaced around the loading axis and movable in mutual distance and approach between the radially expanded condition and the radially contracted condition.

14. The process as claimed in claim 1, wherein the thrust action is carried out by the retaining device coaxial to the geometric axis of rotation of the tyre.

15. The process as claimed in claim 14, wherein the thrust action involves radially expanding a radially expandable peripheral portion of the retaining device.

16. The process as claimed in claim 1, further comprising lifting the tyre from a vulcanisation height to an operating height, which is higher than the vulcanisation height.

17. The process as claimed in claim 1, further comprising axially extracting the retaining device from the tyre following the interruption of the thrust action.

18. The process as claimed in claim 17, wherein the retaining device is configured for retaining the tyre at the operating height; the extraction involving lowering the retaining device from the operating height following the interruption of the thrust action.

19. The process as claimed in claim 1, wherein positioning the unloading device comprises translating the unloading device along a centering path towards the geometric axis of rotation from a radially outer position with respect to the tyre.

20. The process as claimed in claim 1, further comprising transferring the tyre released on the contact surface to an unloading station by displacing the unloading device from a loading position, corresponding to the operating position of the support member, to an unloading position.

21. An apparatus for unloading a vulcanised bicycle tyre from a vulcanisation press, comprising:
a retaining device of the tyre with an operating axis thereof comprising a central body and a radially expandable peripheral portion, wherein the radially expandable peripheral portion comprises an active portion configured for exerting a thrust action directed radially away from the operating axis on a radially inner surface of the tyre for maintaining the tyre in a predetermined work region;

an unloading device having at least one frame and a support member of the tyre arranged around a loading axis, wherein the unloading device is selectively movable towards and away from the operating axis for aligning the loading axis with the operating axis, and the support member is selectively movable with respect to the frame approaching the work region until reaching an operating position located in a radially outer position to the active portion, wherein the support member is provided with a contact surface which, in the operating position, has a supporting portion facing upwards and wherein, in the operating position, the supporting portion is placed at an axially lower position to the tyre.

22. The apparatus as claimed in claim 21, wherein the contact surface has a containment portion shaped to define a radial retaining of the tyre.

23. The apparatus as claimed in claim 21, wherein the contact surface has a concave shape that, in the operating position, at least partially circumscribes an axially lower portion of the tyre engaged with the retaining device.

24. The apparatus as claimed in claim 21, wherein the radially expandable peripheral portion of the retaining device comprises at least one deformable membrane.

25. The apparatus as claimed in claim 24, wherein the deformable membrane is expandable from a contracted condition to an expanded condition, wherein the expanded condition of the deformable membrane is substantially counter-shaped to the radially inner surface of the tyre.

26. The apparatus as claimed in claim 24, wherein the retaining device is defined at least partially by a central body of a vulcanisation press.

27. The apparatus as claimed in claim 24, wherein the retaining device comprises an annular chamber delimited in radially outer position by the deformable membrane and placed in fluid connection with a pressurised fluid source for controlling the expansion or contraction of the deformable membrane.

28. The apparatus as claimed in claim 21, further comprising a lifter connected to the retaining device and configured for vertically translating the retaining device from a vulcanisation height, in which the retaining device lies within a lower half-mould of the vulcanisation press, to an upper operating height in which the retaining device is raised with respect to the lower half-mould.

29. The apparatus as claimed in claim 21, wherein in the operating position, the support member is placed in a region which is radially outer to the central body of the retaining device.

30. The apparatus as claimed in claim 21, wherein the unloading device comprises a handling group operatively interposed between the frame and the support member and configured for translating the support member towards the operating position.

31. The apparatus as claimed in claim 30, wherein the handling group is configured for handling the support member from a position which is distal from the operating axis of the retaining device to a position which is proximal to the operating axis.

32. The apparatus as claimed in claim 30, wherein the handling group is configured for driving the support member towards the operating position according to a handling path having at least one radial contraction stroke approaching the retaining device.

33. The apparatus as claimed in claim 30, wherein the support member comprises a plurality of support sectors mutually and angularly spaced apart around the loading axis.

34. The apparatus as claimed in claim 33, wherein the handling group is configured for contracting the unloading device from a radially expanded condition, in which the sectors are mutually moved apart, to a radially contracted condition, in which the sectors are mutually approached.

35. The apparatus as claimed in claim 21, further comprising a translating group associated with the unloading device and configured for translating the unloading device transversely to the operating axis of the retaining device.

36. The apparatus as claimed in claim 35, wherein the translating group is configured for handling the unloading device between a position which is radially distal from the operating axis and a position which is radially centered with the operating axis.

37. The apparatus as claimed in claim 36, further comprising a picking device of one or more tyres arranged at the radially distal position.

* * * * *